US012583389B2

(12) United States Patent
Kim et al.

(10) Patent No.: US 12,583,389 B2
(45) Date of Patent: Mar. 24, 2026

(54) SYSTEM FOR PROVIDING THREE-DIMENSIONAL IMAGE OF VEHICLE AND VEHICLE INCLUDING THE SAME

(71) Applicant: SAMSUNG ELECTRO-MECHANICS CO., LTD., Suwon-si (KR)

(72) Inventors: Tae Hoon Kim, Suwon-si (KR); Young Jin Cho, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 214 days.

(21) Appl. No.: 18/530,393

(22) Filed: Dec. 6, 2023

(65) Prior Publication Data

US 2024/0270172 A1 Aug. 15, 2024

(30) Foreign Application Priority Data

Feb. 14, 2023 (KR) ......................... 10-2023-0019650

(51) Int. Cl.
| | |
|---|---|
| *H04N 1/27* | (2006.01) |
| *B60R 1/27* | (2022.01) |
| *B60R 11/02* | (2006.01) |

(52) U.S. Cl.
CPC ............ *B60R 1/27* (2022.01); *B60R 11/0229* (2013.01); *B60R 2300/102* (2013.01); *B60R 2300/30* (2013.01); *B60R 2300/70* (2013.01)

(58) Field of Classification Search
CPC . B60R 1/27; B60R 11/0229; B60R 2300/102; B60R 2300/30; B60R 2300/70;
(Continued)

(56) References Cited

U.S. PATENT DOCUMENTS

2016/0065944 A1* 3/2016 Fujii .................... H04N 13/243
348/47
2019/0100145 A1* 4/2019 Chen ..................... G03B 29/00
(Continued)

FOREIGN PATENT DOCUMENTS

JP 2020-119492 A 8/2020
JP 2022-101979 A 7/2022
(Continued)

OTHER PUBLICATIONS

Korean Office Action issued on Jul. 22, 2024, in counterpart Korean Patent Application No. 10-2023-0019650 (7 pages in English, 5 pages in Korean).

*Primary Examiner* — James M Pontius
(74) *Attorney, Agent, or Firm* — NSIP Law

(57) ABSTRACT

A vehicle three-dimensional image system includes a computing device configured to generate a synthesized three-dimensional image by acquiring a plurality of images from a plurality of cameras installed on a vehicle and arranging the plurality of images on a surface of a three-dimensional projection model, wherein the computing device is configured to generate the synthesized three-dimensional image by storing a plurality of three-dimensional projection models, selecting one of the plurality of three-dimensional projection models according to input information, and arranging the plurality of images on a surface of the selected three-dimensional projection model.

14 Claims, 21 Drawing Sheets

(58) Field of Classification Search
  CPC ....... B60R 1/22; B60R 1/31; B60R 2300/105;
     B60R 2300/303; B60R 2300/304; B60R
      2300/802; B60R 2300/8073; H04N
      13/243; H04N 13/363; G06T 17/00;
     B60K 35/00; B60K 35/211; B60K 35/28;
      B60K 35/29; B60Y 2400/92
  See application file for complete search history.

(56)     References Cited

U.S. PATENT DOCUMENTS

| | | |
|---|---|---|
| 2022/0107497 A1 | 4/2022 | Murata et al. |
| 2022/0118916 A1 | 4/2022 | Kang |
| 2022/0203895 A1* | 6/2022 | Moriyama .............. B60R 1/002 |

FOREIGN PATENT DOCUMENTS

| | | |
|---|---|---|
| KR | 10-2022-0052172 | 4/2022 |
| WO | WO 2020/110580 A1 | 6/2020 |

* cited by examiner

IM21      IM1      IM31

110

IM2 120    150    130 IM3

160    170

V1

180

140

IM24      IM4      IM34

MD2

IM21　　　　　IM1　　　　　IM31

110

IM2　120　　150　　130　IM3

160　　170

V1

180

140

IM24　　　IM4　　　IM34

FMD4

FMD4 (left expanded)

FMD4 (right expanded)

FMD5

FMD5 (left expanded)

FMD5 (right expanded)

MD3 duplication-1

MD4 duplication-2

MD6

SYSTEM FOR PROVIDING THREE-DIMENSIONAL IMAGE OF VEHICLE AND VEHICLE INCLUDING THE SAME

CROSS-REFERENCE TO RELATED APPLICATIONS

This application claims the benefit under 35 USC 119(a) Korean Patent Application No. 10-2023-0019650 filed on Feb. 14, 2023, in the Korean Intellectual Property Office, the entire disclosure of which is incorporated herein by reference for all purposes.

BACKGROUND

1. Field

The present disclosure relates to a system for providing a three-dimensional image for a vehicle and a vehicle including the same.

2. Description of the Background

A blind spot that a driver cannot see while driving is a major risk factor threatening driver safety. A driver who drives a vehicle usually only looks forward, so it is difficult to pay attention to objects behind the vehicle. To eliminate such a risk factor, various blind spot removal devices have been developed for use in a vehicle. In order to eliminate blind spots that cannot be seen in side mirrors, devices integrating auxiliary mirrors or detecting objects behind a vehicle with an infrared sensor and notifying the driver of danger through an alarm are being developed and applied to actual vehicles. There may be methods to reduce blind spots by outputting images from behind the vehicle to a driver's display. However, such methods fundamentally have a disadvantage of removing only a portion of a driver's blind spot.

In particular, in the case of large vehicles, there are many areas that cannot be checked with just a side mirror or a rearview mirror, so before starting the vehicle, it is necessary to look around the vehicle and check with a naked eye whether there are any obstacles, to prevent traffic safety accidents such as contact accidents and personal injury accidents from occurring. In addition, when a driver wants to park a vehicle, the driver cannot check left and right sides, and the area behind the vehicle at a glance, so an inexperienced driver may have an accident due to contact with a vehicle parked nearby or a parking garage pillar. Furthermore, even if there is an obstacle located in front of the vehicle, the obstacle may be obscured by a frame portion located between a vehicle's windshield and a door, and if children sitting and playing in front of or behind of the vehicle are not discovered, this may lead to a fatal accident.

In order to prevent accidents that may occur due to blind spots when driving and parking the vehicle, a front camera for recognizing environments and situations such as a road and vehicle in front thereof while driving, and various sensing cameras for detecting the vehicle's surroundings on the left and right sides, and behind of the vehicle, and a plurality of top view cameras for providing an image looking downwardly at the vehicle from above when parking may be installed on the vehicle. In addition, a plurality of side-view cameras to replace a side mirror of the vehicle, which is vulnerable to resistance to external impacts while driving may be installed, and a surround view monitoring (SVM) displaying 360 degree images around the vehicle may also be installed in the vehicle. Furthermore, an advanced driver assistance system (ADAS) or self-driving vehicle may reduce traffic accidents and support travel efficiency and convenience. In addition to top-view cameras and side-view cameras, self-driving vehicles may be expected to be provided with blind spot detection cameras, e-mirror cameras, and A-pillar cameras.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a vehicle three-dimensional image system includes a computing device configured to generate a synthesized three-dimensional image by acquiring a plurality of images from a plurality of cameras installed on a vehicle and arranging the plurality of images on a surface of a three-dimensional projection model, wherein the computing device is configured to generate the synthesized three-dimensional image by storing a plurality of three-dimensional projection models, selecting one of the plurality of three-dimensional projection models according to input information, and arranging the plurality of images on a surface of the selected three-dimensional projection model.

The input information may include at least one of driving direction information, driving speed information, gear shift information, and surrounding environment information of the vehicle.

The input information may include at least one of information input by a driver of the vehicle, and information received remotely from an outside of the vehicle.

The computing device may be configured to transmit the synthesized three-dimensional image to a display device, change the selected three-dimensional projection model to an other one of the plurality of three-dimensional projection models according to the input information after the synthesized three-dimensional image is output by the display device, and arrange the plurality of images on a surface of the changed three-dimensional projection model.

The computing device may be configured to store a look-up table, and arrange the plurality of images on a surface of the three-dimensional projection model selected by correspondence between the input information and the three-dimensional projection models in the look-up table.

The number of the plurality of cameras may be four or more, and an image acquired by at least one of the plurality of cameras may be arranged on one surface of the plurality of three-dimensional projection models and may not be arranged on an other surface thereof.

The plurality of three-dimensional projection models may include first and second three-dimensional projection models, the computing device may be configured to generate the synthesized three-dimensional image by arranging the plurality of images on one surface selected from the first and second three-dimensional projection models, the first three-dimensional projection model may have a shape relatively closer to a sphere than the second three-dimensional projection model, and the second three-dimensional projection model may have a shape relatively closer to a polyhedron than the first three-dimensional projection model.

The plurality of three-dimensional projection models may further include a fusion three-dimensional projection model in which a portion of the first three-dimensional projection model and a portion of the second three-dimensional projection model are mixed.

The fusion three-dimensional projection model may include an asymmetrical fusion three-dimensional projection model in which, a portion of the fusion three-dimensional projection model, corresponding to one side of a default driving direction of the vehicle and a portion of the fusion three-dimensional projection model, corresponding to the other side thereof may be asymmetrical to each other, and the computing device may be configured to generate the synthesized three-dimensional image by selecting the asymmetrical fusion three-dimensional projection model according to a driving direction information of the vehicle and arranging the plurality of images on the selected asymmetrical fusion three-dimensional projection model.

A vehicle may include the vehicle three-dimensional image system, a plurality of cameras configured to transmit a plurality of images to the computing device, and a display device configured to output a synthesized three-dimensional image received from the computing device.

In another general aspect, a vehicle three-dimensional image system includes a computing device configured to generate a synthesized three-dimensional image by acquiring a plurality of images from a plurality of cameras installed on a vehicle, and arranging the plurality of images on a surface of a three-dimensional projection model, wherein the computing device is configured to generate the synthesized three-dimensional image by arranging the plurality of images on a surface of a fusion three-dimensional projection model in which a portion of a first three-dimensional projection model and a portion of a second three-dimensional projection model are mixed according to input information, the first three-dimensional projection model has a shape relatively closer to a sphere than the second three-dimensional projection model, and the second three-dimensional projection model has a shape relatively closer to a polyhedron than the first three-dimensional projection model.

The fusion three-dimensional projection model may include an asymmetrical fusion three-dimensional projection model in which a portion of the fusion three-dimensional projection model, corresponding to one side of a reference driving direction of the vehicle and a portion of the fusion three-dimensional projection model, corresponding to the other side thereof are asymmetrical to each other, and the computing device may be configured to generate the synthesized three-dimensional image by selecting the asymmetrical fusion three-dimensional projection model according to a driving information of the vehicle and arranging the plurality of images on the selected asymmetric fusion three-dimensional projection model.

The input information may include at least one of driving direction information, driving speed information, gear shift information, surrounding environment information of the vehicle, information input by a driver of the vehicle, and information received remotely from an outside of the vehicle, and the computing device may be configured to store a look-up table that corresponds a portion of the input information and the fusion three-dimensional projection model to each other.

The computing device may be configured to generate the synthesized three-dimensional image by selecting one of the fusion three-dimensional projection model, the first three-dimensional projection model, and the second three-dimensional projection model according to input information, and arranging the plurality of images on a surface of the selected three-dimensional projection model.

The number of the plurality of cameras may be four or more, and an image acquired by at least one of the plurality of cameras may be arranged on one surface of one of the fusion three-dimensional projection model, the first three-dimensional projection model, and the second three-dimensional projection model and may not be arranged on remaining surfaces thereof.

In another general aspect, a non-transitory computer-readable storage medium storing instructions that, when executed by a processor, cause the processor to generate a synthesized three-dimensional image by acquiring a plurality of images from a plurality of cameras installed on a vehicle, and arranging the plurality of images on a surface of a three-dimensional projection model, and transmit the synthesized three-dimensional image to a display device configured to output the synthesized three-dimensional image, wherein the synthesized three-dimensional image is generated by storing a plurality of three-dimensional projection models, selecting one of the plurality of three-dimensional projection models according to input information, and arranging the plurality of images on a surface of the selected three-dimensional projection model.

Other features and aspects will be apparent from the following detailed description, the drawings, and the claims.

Figure 1A:
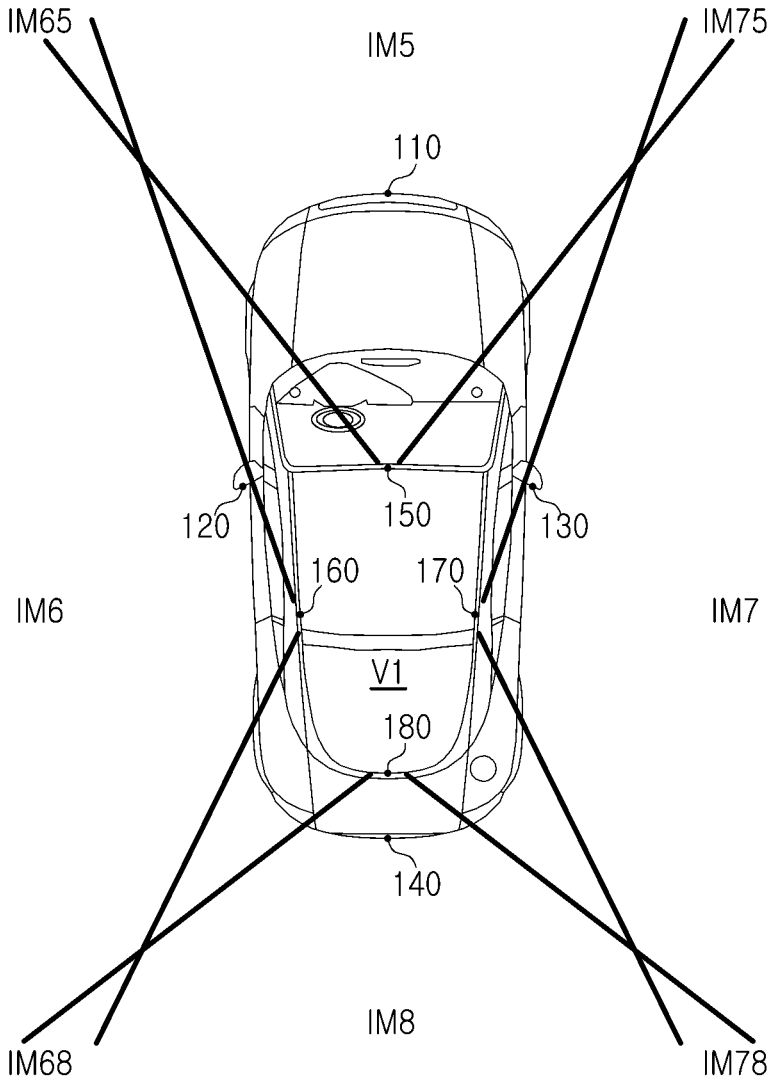
FIGS. 1A and 1B are diagrams illustrating a range in which a plurality of images are acquired from a plurality of cameras in a system for providing a three-dimensional image for a vehicle (vehicle three-dimensional image system) according to an embodiment of the present disclosure.

Throughout the drawings and the detailed description, unless otherwise described, the same reference numerals refer to the same elements. The drawings may not be to scale, and the relative size, proportions, and depiction of elements in the drawings may be exaggerated for clarity, illustration, and convenience.

DETAILED DESCRIPTION

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

An aspect of the present disclosure may provide a system for providing a three-dimensional image for a vehicle (vehicle three-dimensional image system) capable of providing a synthesized three-dimensional image by acquiring a plurality of images from cameras installed in a vehicle, and a vehicle including the same.

Figure 1B:
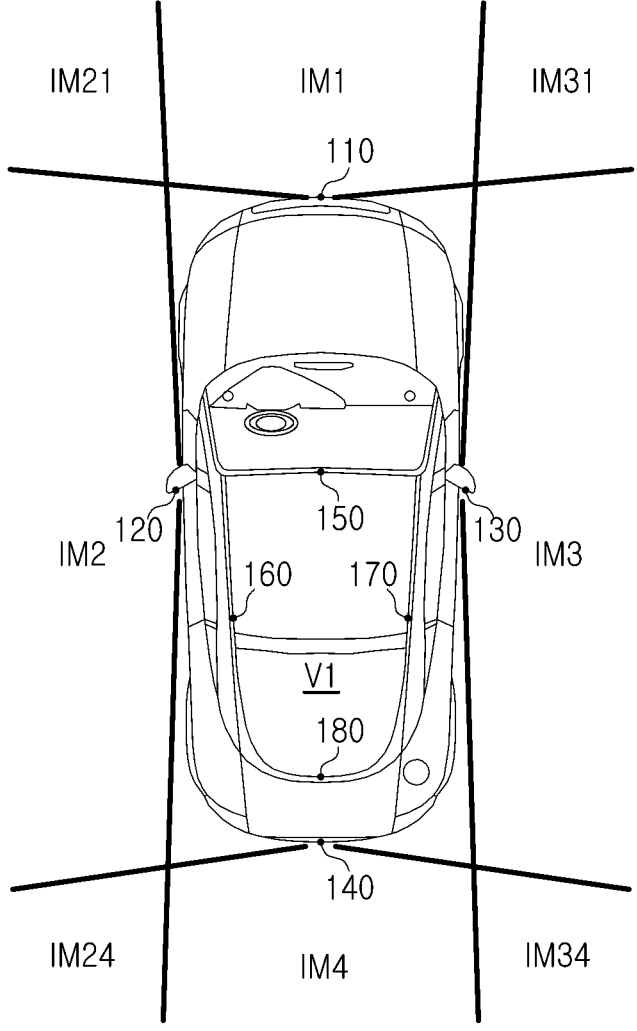

Referring to FIGS. 1A and 1B, a plurality of cameras 110, 120, 130, 140, 150, 160, 170, and 180 may be installed in a vehicle V1 to acquire a plurality of images IM1, IM2, IM3, IM4, IM5, IM6, IM7, and IM8. An acquisition range of the plurality of images IM1, IM2, IM3, IM4, IM5, IM6, IM7, and IM8 may be determined by a field of view of the plurality of cameras 110, 120, 130, 140, 150, 160, 170, and 180.

At least a portion of the plurality of cameras 110, 120, 130, 140, 150, 160, 170, and 180 may be disposed in a position for at least one of surround view monitoring, top view monitoring, and side-view monitoring in a vehicle V1. For example, the plurality of cameras 110, 120, 130, and 140 may be disposed relatively closer to an edge of the vehicle V1 for surround view monitoring to obtain images IM1, IM2, IM3, and IM4 on a front side, a left side, a right side, and a rear side of the vehicle V1. For example, the plurality of cameras 150, 160, 170, and 180 may be disposed relatively closer to a top surface (e.g., roof) of the vehicle V1 for top view monitoring, so that images IM5, IM6, IM7, and IM8 may be acquired in a direction from the top surface of the vehicle V1 looking downwardly at a ground at the front side, left side, right side, and rear side. For example, a flexible printed circuit board (flexible PCB) may be disposed in a region at least within a certain distance (e.g., 20 cm) from the top surface (e.g., roof) of the vehicle V1, and one or more of the plurality of cameras 110, 120, 130, 140, 150, 160, 170, and 180 may be mounted thereon.

Figure 2A:
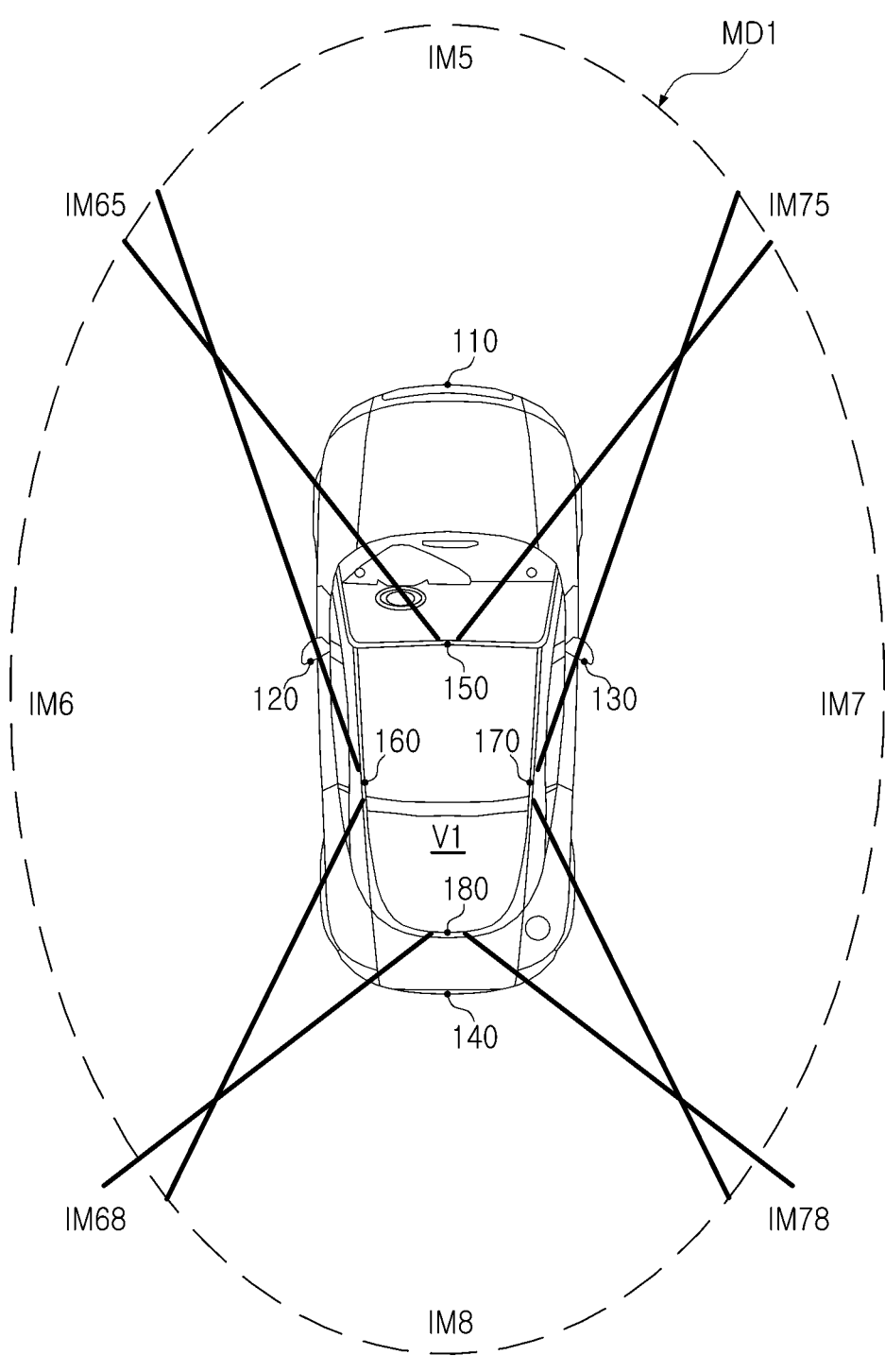
FIG. 2A is a diagram illustrating a first three-dimensional projection model of a system for providing a three-dimensional image for a vehicle according to an embodiment of the present disclosure.
Figure 2B:
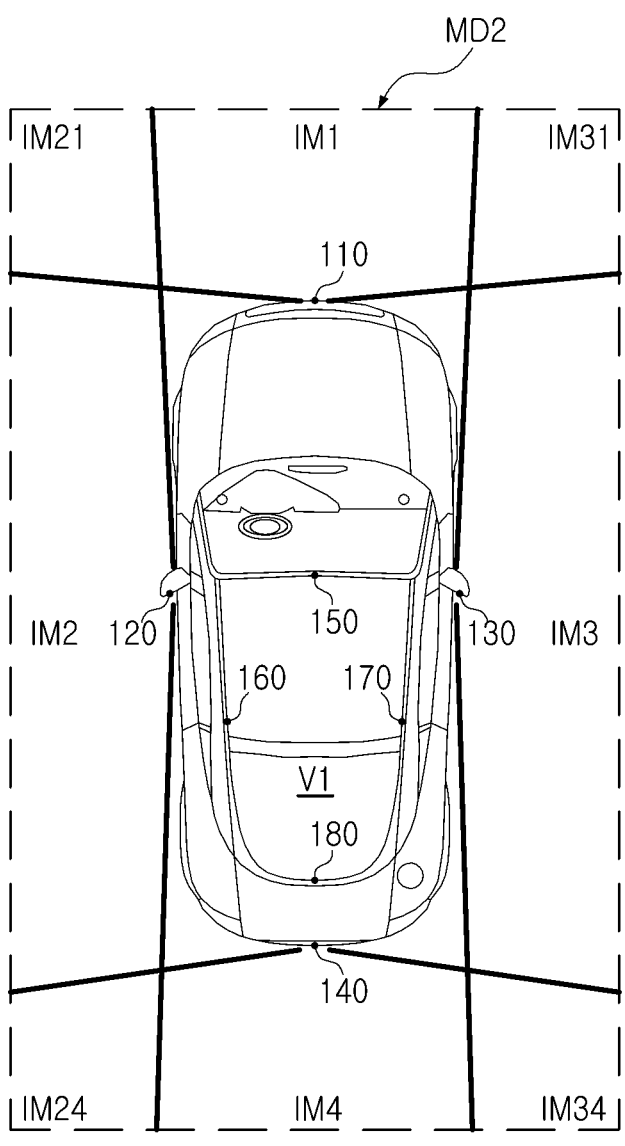
FIG. 2B is a diagram illustrating a second three-dimensional projection model of a system for providing a three-dimensional image for a vehicle according to an embodiment of the present disclosure.

Referring to FIGS. 2A and 2B, a plurality of cameras 110, 120, 130, 140, 150, 160, 170, and 180 may transmit a plurality of images IM1, IM2, IM3, IM4, IM5, IM6, IM7, and IM8 to a computing device (210 in FIG. 3A), and the computing device (210 in FIG. 3A) may generate a synthesized three-dimensional image by arranging at least a portion of the plurality of images IM1, IM2, IM3, IM4, IM5, IM6, IM7, and IM8 on a surface of one or more of a plurality of three-dimensional projection models MD1 and MD2.

For example, the synthesized three-dimensional image may be provided to a driver of the vehicle V1, used for autonomous driving of the vehicle V1, or provided to a system (e.g., a road traffic system) affecting the surrounding environment of the vehicle V1. The smaller a difference between the synthesized three-dimensional image and an actual image, the greater safety and efficiency of the vehicle V1 and the surrounding environments thereof.

In the computing device (210 in FIG. 3A), a boundary line of each of the plurality of images IM1, IM2, IM3, IM4, IM5, IM6, IM7, and IM8 may be stitched to a boundary line of adjacent images based on a pixel value pattern at the boundary line (e.g., a pattern corresponding to a road lane, and a pattern corresponding to a floor parking line). Overlapping regions IM21, IM24, IM31, IM34, IM65, IM68, IM75, and IM78 of the plurality of images (IM1, IM2, IM3, IM4, IM5, IM6, IM7, IM8) may include the stitched boundary line. Overlapping regions field of views of the plurality of images IM1, IM2, IM3, IM4, IM5, IM6, IM7, and IM8 may be 5 degrees or more, but an embodiment thereof is not limited thereto. For example, if the total number of cameras 110, 120, 130, 140, 150, 160, 170, and 180 is four, the field of view of each camera may be 180 degrees or more. For example, if the total number of cameras 110, 120, 130, 140, 150, 160, 170, and 180 is 5 or more, the field of view of each camera may be narrower than 180 degrees, and may be a field of view, designed so that overlapping regions IM21, IM24, IM31, IM34, IM65, IM68, IM75, and IM78 rarely occur.

The overlapping regions IM21, IM24, IM31, IM34, IM65, IM68, IM75, and IM78 may affect a difference between a synthesized three-dimensional image and an actual image. For example, if there are objects in the overlapping regions IM21, IM24, IM31, IM34, IM65, IM68, IM75, and IM78, a difference between the object's characteristics (e.g., shape, size) in the synthesized three-dimensional image and characteristics of an actual object may vary according to a distance between the object and the vehicle V1 and a shape (or posture), size (or aspect ratio), brightness (or color) of the object, or surrounding environment (e.g., shadows, weather).

Characteristics of the overlapping regions IM21, IM24, IM31, IM34, IM65, IM68, IM75, and IM78 may vary depending on which three-dimensional projection model is selected among a plurality of three-dimensional projection models MD1 and MD2. For example, a portion corresponding to the overlapping regions IM21, IM24, IM31, and IM34 in a second three-dimensional projection model MD2, which is relatively closer to a polyhedron, may have a more angular shape compared to a portion corresponding to the overlapping regions IM65, IM68, IM75, and IM78 in a first three-dimensional projection model MD1, which is relatively closer to a sphere. Whether it has an angular shape may greatly affect the characteristics of the overlapping regions M21, IM24, IM31, IM34, IM65, IM68, IM75, and IM78.

For example, a difference in the characteristics between the overlapping regions IM65, IM68, IM75, and IM78 of a plurality of images arranged on a surface of one of the plurality of three-dimensional projection models MD1 and the overlapping regions IM21, IM24, IM31, and IM34 of a plurality of images arranged on a surface of the other one of the plurality of three-dimensional projection models MD2 may be greater than a difference in the characteristics between the plurality of images IM5, IM6, IM7, and IM8 arranged on the surface of the one of the plurality of three-dimensional projection models MD1 and the plurality of images IM1, IM2, IM3, and IM4 arranged on the surface of the other one of the plurality of three-dimensional projection models MD2.

The computing device (210 in FIG. 3A) of the 3D image providing system for a vehicle according to an embodiment of the present disclosure may store a plurality of three-dimensional projection models MD1 and MD2, select one of the plurality of three-dimensional projection models MD1 and MD2 according to input information, and generate a synthesized three-dimensional image by arranging a plurality of images IM1, IM2, IM3, IM4, IM5, IM6, IM7, and IM8 on a surface of the selected three-dimensional projection model. Accordingly, a difference between the synthesized three-dimensional image and an actual image can be efficiently reduced, and the safety and efficiency of the vehicle V1 and a surrounding environment thereof can be efficiently improved. Here, the input information may include at least one of driving direction information, driving speed information, gear shifting information, surrounding environment information, information input by a driver of the vehicle V1, and information remotely received from outside the vehicle V1.

Figure 8A:
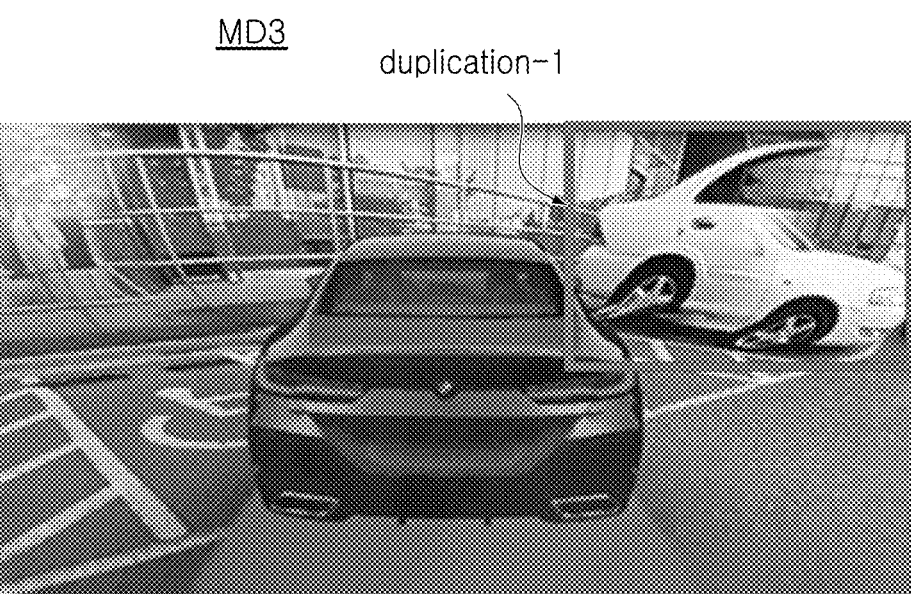
FIGS. 8A and 8B are diagrams illustrating a first characteristic (duplication) that may appear in a synthesized three-dimensional image when a three-dimensional projection model or a fusion three-dimensional projection model is inappropriately selected.
Figure 8B:
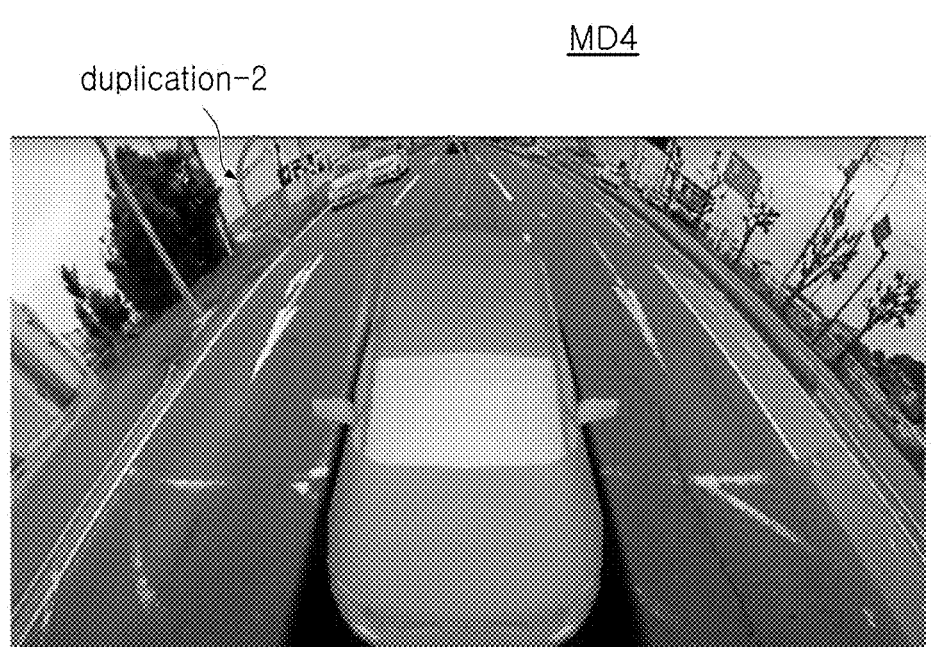

For example, referring to FIGS. 8A and 8B, a difference between an overlapping region of the plurality of images of the synthesized three-dimensional image based on non-variable three-dimensional projection models MD3 and MD4 and an actual view may vary depending on a situation, and a first characteristic (duplication-1, duplication-2) may appear when the difference between the overlapping region and the actual view is large. The first characteristic (duplication-1, duplication-2) may mean that one object is expressed as a plurality of objects.

Figure 9A:
FIGS. 9A and 9B are diagrams illustrating a second characteristic (ghost) that may appear in a synthesized three-dimensional image when a three-dimensional projection model or a fusion three-dimensional projection model is inappropriately selected.
Figure 9B:

For example, referring to FIGS. 9A and 9B, a difference between an overlapping region of the plurality of images of the synthesized three-dimensional image based on non-variable three-dimensional projection models MD5 and MD6 and an actual one may vary depending on a situation, and a second characteristic (ghost-1, ghost-2) may appear when the difference between the overlapping region and the actual one is large. The second characteristic (ghost-1, ghost-2) may mean that an object close to a specific camera is expressed as a giant wall, and may be expressed not only as a ghost but also as a giant wall effect.

The first characteristic (duplication-1, duplication-2) and the second characteristic (ghost-1, ghost-2) may have a negative impact on the safety and efficiency of the vehicle V1 and a surrounding environment thereof. In a situation in which the first characteristic (duplication-1, duplication-2) and the second characteristic (ghost-1, ghost-2) appears, the computing device (210 in FIG. 3A) of the 3D image providing system for a vehicle according to an embodiment of the present disclosure may appropriately select the three-dimensional projection model so that the first characteristic (duplication-1, duplication-2) and the second characteristic (ghost-1, ghost-2) may be removed or reduced, so that the safety and efficiency of the vehicle V1 and the surrounding environment may be improved.

Figure 2C:
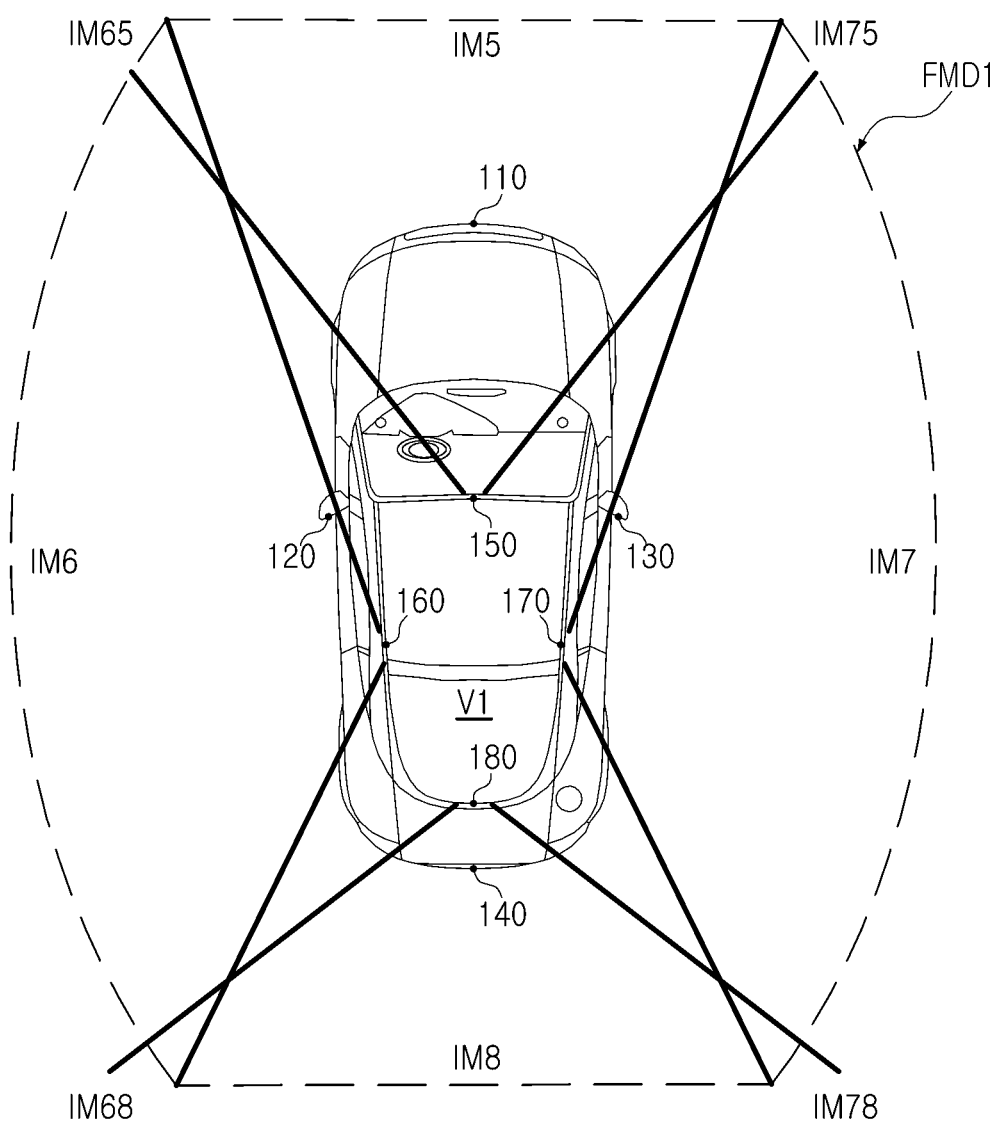
FIG. 2C is a diagram illustrating a symmetrical projection model of a fusion three-dimensional projection model of a system for providing a three-dimensional image for a vehicle according to an embodiment of the present disclosure.
Figure 2D:
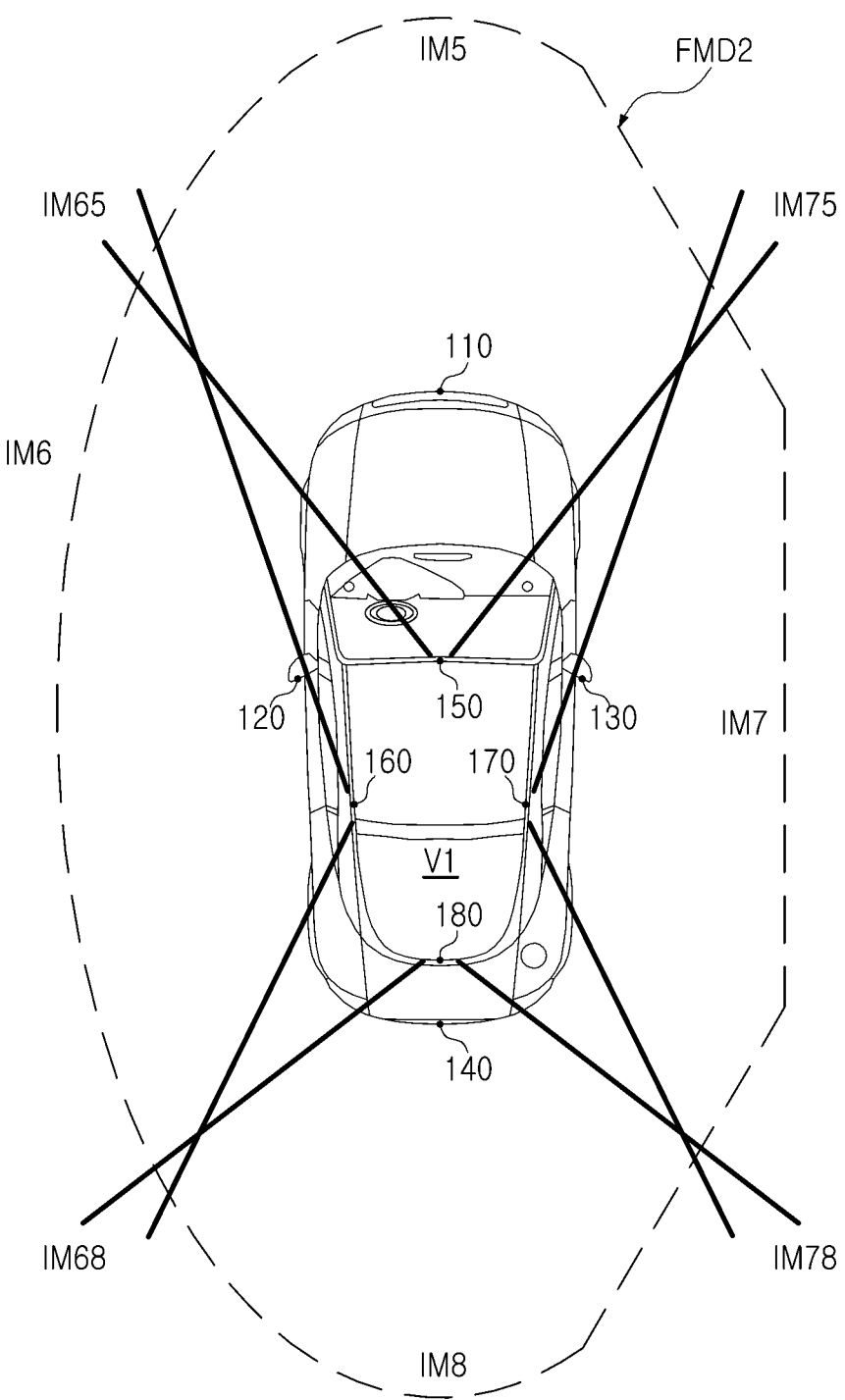
FIGS. 2D and 2E are diagrams illustrating an asymmetrical projection model of a fusion three-dimensional projection model of a system for providing a three-dimensional image for a vehicle according to an embodiment of the present disclosure.
Figure 2E:
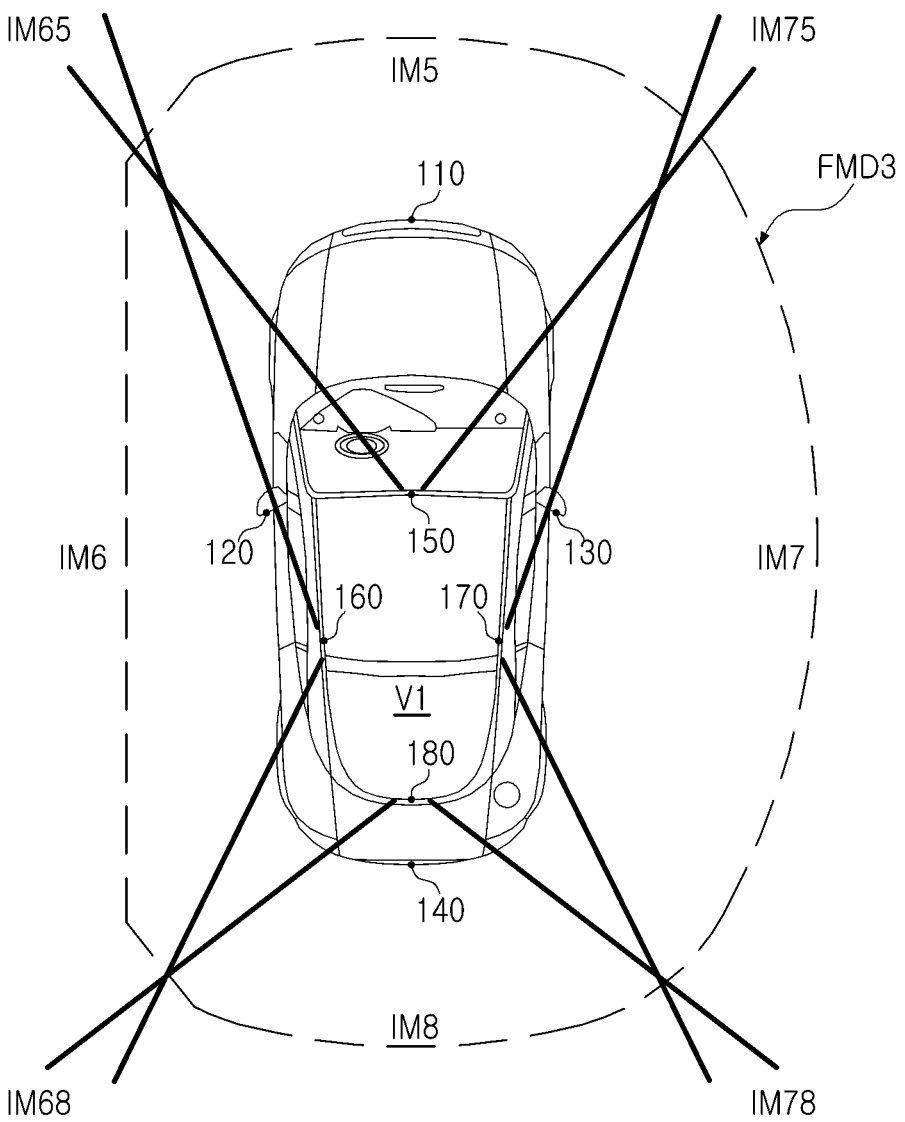

Referring to FIGS. 2C, 2D, and 2E, the plurality of cameras 150, 160, 170, and 180 may transmit a plurality of images IM5, IM6, IM7, and IM8 to the computing device (210 in FIG. 3A), and the computing device (210 in FIG. 3A) may generate a synthesized three-dimensional image by arranging at least a portion of the images IM5, IM6, IM7, and IM8 on a surface of the fusion three-dimensional projection model FMD1, FMD2, and FMD3.

The computing device (210 in FIG. 3A) may generate and store fusion three-dimensional projection models FMD1, FMD2, and FMD3 by mixing a portion of the first three-dimensional projection model MD1 of FIG. 2A and a portion of the second three-dimensional projection model MD2 of FIG. 2B. For example, a mixing portion and mixing ratio of the fusion three-dimensional projection models FMD1, FMD2, and FMD3 may be determined according to input information input to the computing device (210 in FIG. 3A).

Referring to FIG. 2C, the fusion three-dimensional projection model FMD1 may be a symmetric fusion three-dimensional projection model in which a portion corresponding to one side of a default driving direction (vertical direction in FIG. 2C) of the vehicle V1 and a portion corresponding to the other side thereof are symmetrical to each other. For example, a portion corresponding to left and right sides of the fusion three-dimensional projection model FMD1 may be a portion of the first three-dimensional projection model MD1 of FIG. 2A, and a portion corresponding to front and rear sides in the fusion three-dimensional projection model FMD1 may be a portion of the second three-dimensional projection model MD2 of FIG. 2B.

For example, when the vehicle V1 drives steadily in a specific speed range, a difference between the synthesized three-dimensional image of the fusion three-dimensional projection model (FMD1) and the actual image may be the smallest. Accordingly, input information input to the computing device (210 in FIG. 3A) may be driving speed information or gear shift information.

Referring to FIGS. 2D and 2E, the fusion three-dimensional projection models FMD2 and FMD3 may be an asymmetric fusion three-dimensional projection model in which a portion corresponding to one side of a default driving direction (vertical direction in FIG. 2C) of the vehicle V1 and a portion corresponding to the other side thereof are asymmetrical to each other. For example, a portion corresponding to a right side in the fusion three-dimensional projection model FMD2 and a portion corresponding to a left side in the fusion three-dimensional projection model FMD3 may be a portion of the second three-dimensional projection model, relatively closer to a polyhedron, and a remaining portion thereof may be a portion of the first three-dimensional projection model, relatively closer to a sphere.

For example, when the vehicle V1 turns right or left at an intersection or changes lanes, a difference between the synthesized three-dimensional images of the fusion three-dimensional projection models FMD2 and FMD3 and an actual image may be the smallest. Accordingly, input information input to the computing device (210 in FIG. 3A) may be driving direction information of the vehicle V1. That is, the computing device (210 in FIG. 3A) may select asymmetrical fusion three-dimensional projection models FMD2 and FMD3 according to the driving direction information of the vehicle V1 and generate a synthesized three-dimensional image by arranging a plurality of images IM5, IM6, IM7, and IM8 on the selected asymmetrical fusion three-dimensional projection model.

The computing device (210 in FIG. 3A) may select one of the fusion three-dimensional projection models FMD1, FMD2, and FMD3, the first three-dimensional projection model MD1 and the second three-dimensional projection model MD2, and generate a synthesized three-dimensional image by arranging a plurality of images IM5, IM6, IM7, and IM8 on a surface of the selected three-dimensional projection model. That is, not only the first and second three-dimensional projection models MD1 and MD2 but also the fusion three-dimensional projection models FMD1, FMD2, and FMD3 may be selectively used or not used depending on input information. The greater the number of selectable three-dimensional projection models MD1, MD2, FMD1, FMD2, and FMD3, the smaller the difference between the synthesized three-dimensional image and the actual image can be, and the safety and efficiency of the vehicle V1 and a surrounding environment thereof can be further improved.

For example, the number of cameras 110, 120, 130, 140, 150, 160, 170, and 180 may be four or more (e.g., eight), and an image acquired by at least one of the plurality of cameras 110, 120, 130, 140, 150, 160, 170, and 180 may be arranged on a surface of one of the plurality of three-dimensional projection models MD1, MD2, FMD1, FMD2, and FMD3, and may not be arranged on the other surface thereof. That is, whether to use at least one of the plurality of cameras 110, 120, 130, 140, 150, 160, 170, and 180 may be optional, the larger the number of selectable cameras 110, 120, 130, 140, 150, 160, 170, and 180, the smaller the difference between the synthesized three-dimensional image and the actual image can be, and the safety and efficiency of the vehicle V1 and a surrounding environment thereof can be further improved. For example, at least one of the plurality of cameras 150, 160, 170, and 180 may be arranged on a surface of the first three-dimensional projection model MD1 and the fusion three-dimensional projection model FMD1, FMD2, and FMD3, and may not be arranged on a surface of the second three-dimensional projection model MD2.

Figure 3A:
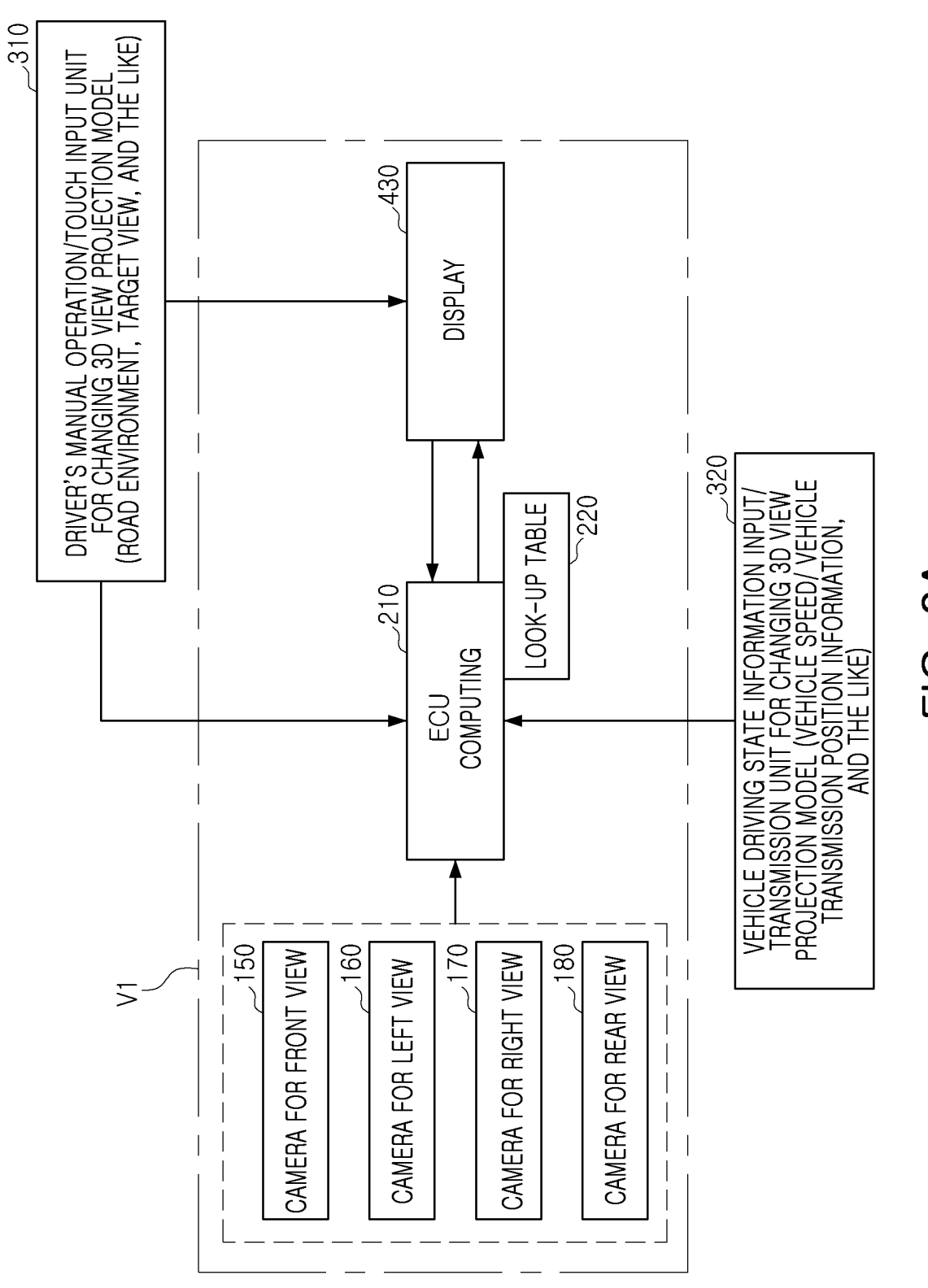
FIG. 3A is a block diagram illustrating a system for providing a three-dimensional image for a vehicle according to an embodiment of the present disclosure.

Referring to FIG. 3A, a vehicle V1 according to an embodiment of the present invention may include a plurality of cameras 150, 160, 170, and 180, a computing device 210, and a display device 430, wherein the computing device 210 may receive input information from at least one of a first input device 310 and a second input device 320.

For example, the computing device 210 may include a processing device such as a processor (e.g., CPU, GPU), a storage device such as memory, an input device receiving a plurality of images, a communication device supporting remote communication, and an output device outputting a synthesized three-dimensional image.

The computing device 210 may store a look-up table 220 that corresponds input information and three-dimensional projection models with each other, select a three-dimensional projection model corresponding to the received input information from the look-up table 220, and generate a synthesized three-dimensional image by arranging a plurality of images on the surface of the selected three-dimensional projection model. Accordingly, selection adequacy and speed of the three-dimensional projection model can be further improved, the difference between the synthesized three-dimensional image and an actual image can be effectively reduced, and the safety and efficiency of the vehicle V1 and a surrounding environment thereof can be efficiently improved. As the speed increases, it may be advantageous to reduce required specifications, unit cost, or heat generation of the computing device 210.

For example, when driving speed information of input information corresponds to parking or reversing of the vehicle V1, the computing device 210 may select a second three-dimensional projection model, close to a polyhedron. For example, when the driving speed information of the input information corresponds to driving of the vehicle V1 or stopping of the vehicle V1 at an intersection, the computing device 210 may select a first three-dimensional projection model, close to a sphere. For example, when surrounding environment information of input information corresponds to low density of objects around the vehicle V1 or the intersection, the computing device 210 may select a first three-dimensional projection model, close to a sphere. Here, each of the first and second three-dimensional projection models may be selected in further detail according to additional input information. For example, a shape of the second three-dimensional projection model may be close to a cuboid or a cube depending on the input information, and a shape of the first three-dimensional projection model may be close to an oval shape, a cylindrical shape, or a bowl shape depending on the input information. That is, a shape close to a sphere includes at least an oval shape, a cylindrical shape, and a bowl shape.

For example, when the driving direction information of the input information corresponds to a left or right turn of the vehicle V1, the computing device 210 may select a first fusion three-dimensional projection model. For example, when the driving direction information of the input information corresponds to a lane change of the vehicle V1, the computing device 210 may select a second fusion three-dimensional projection model. For example, when surrounding environment information of the input information corresponds to high density of objects around the vehicle V1 or an alley, the computing device 210 may select a second three-dimensional projection model, close to a polyhedron. For example, the surrounding environment information may be generated by sensors for detecting lanes on a road or parking lines on a floor, or by sensors for detecting pedestrians or surrounding facilities such as traffic lights or street lights. The computing device 210 may learn to further improve accuracy of correspondence between surrounding environment information and three-dimensional projection models by applying accumulated surrounding environment information to a deep learning algorithm.

Figure 3B:
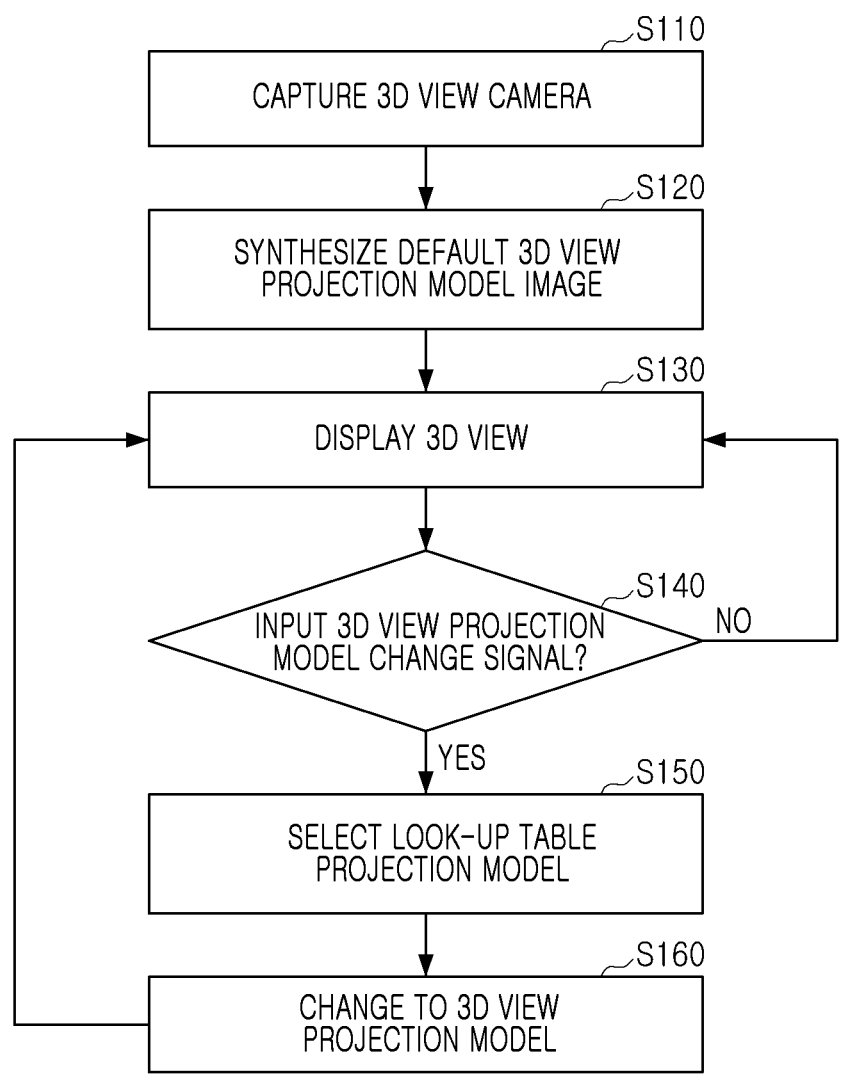
FIG. 3B is a flowchart illustrating an operation a system for providing a three-dimensional image for a vehicle according to an embodiment of the present disclosure.

Referring to FIGS. 3A and 3B, the plurality of cameras 150, 160, 170, and 180 may capture a plurality of images (S110), the computing device 210 may generate a synthesized three-dimensional image (S120) using a default three-dimensional projection model, and the display device 430 may display the synthesized three-dimensional image (S130), the computing device 210 may determine whether a change signal including input information is input to the computing device 210 (S140), the computing device 210 may select a three-dimensional (3D) projection model, different from a default three-dimensional projection model according to the input information (S150), and the computing device 210 may generate a synthesized three-dimensional image by arranging a plurality of images on a surface of the changed three-dimensional projection model (S160).

Figure 4:
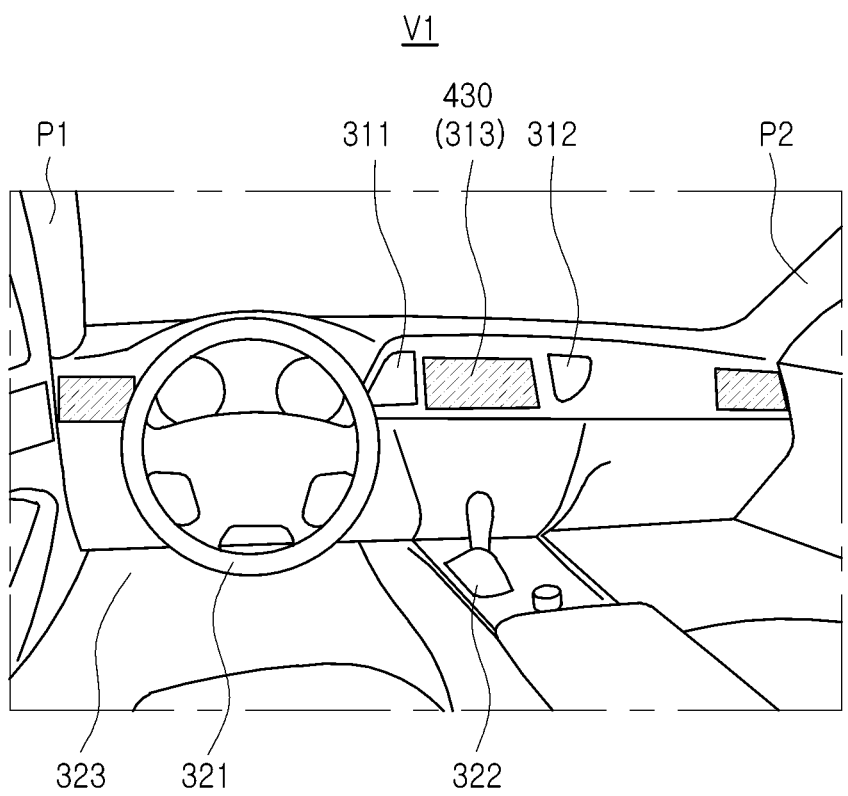
FIG. 4 is a diagram illustrating devices that can provide input information of a system for providing a three-dimensional image for a vehicle according to an embodiment of the present disclosure.
Figure 5A:
FIGS. 5A to 5C are diagrams illustrating synthesized three-dimensional images according to various fusion three-dimensional projection models (FMD4) that can be selected according to driving direction information of a vehicle that can be included in the input information.
Figure 5B:
Figure 5C:
Figure 6A:
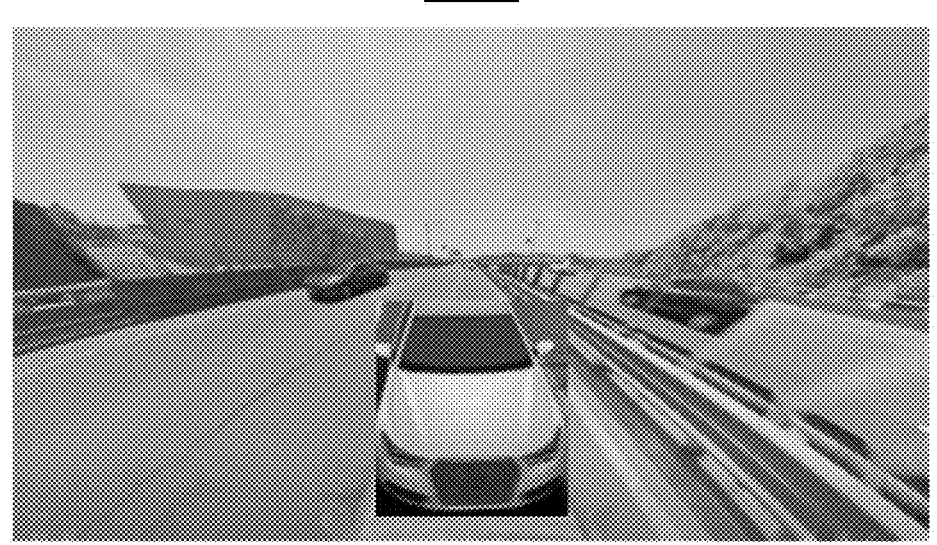
FIGS. 6A to 6C are diagrams illustrating synthesized three-dimensional images according to various fusion three-dimensional projection models (FMD5) that can be selected according to driving speed information of a vehicle that can be included in the input information.
Figure 6B:
Figure 6C:
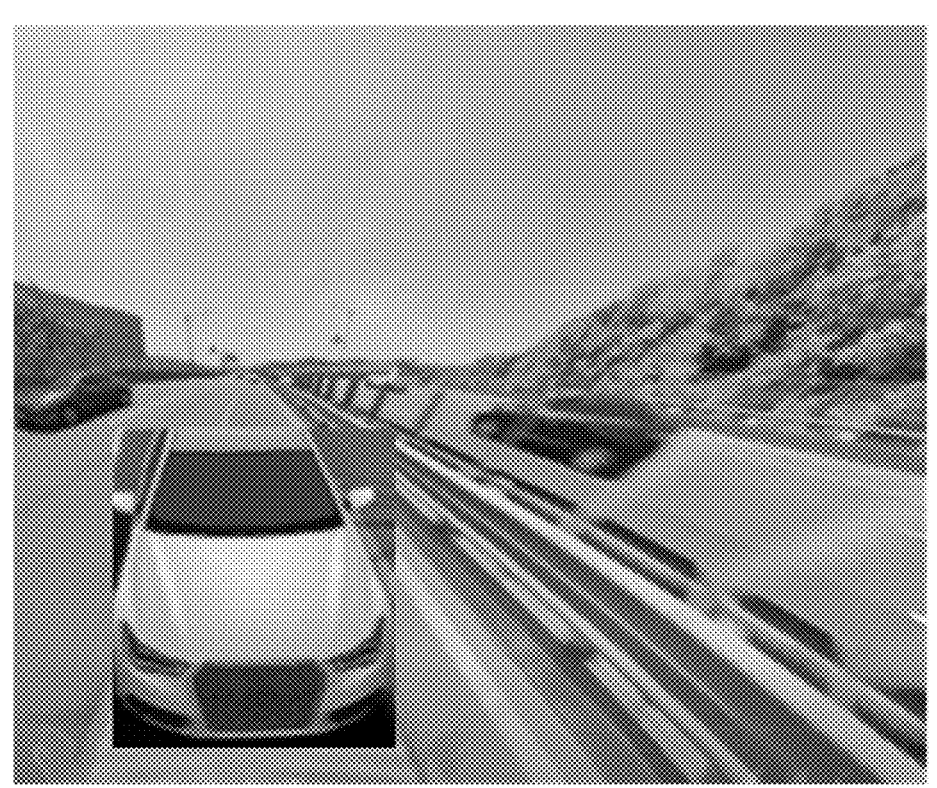
Figure 7:
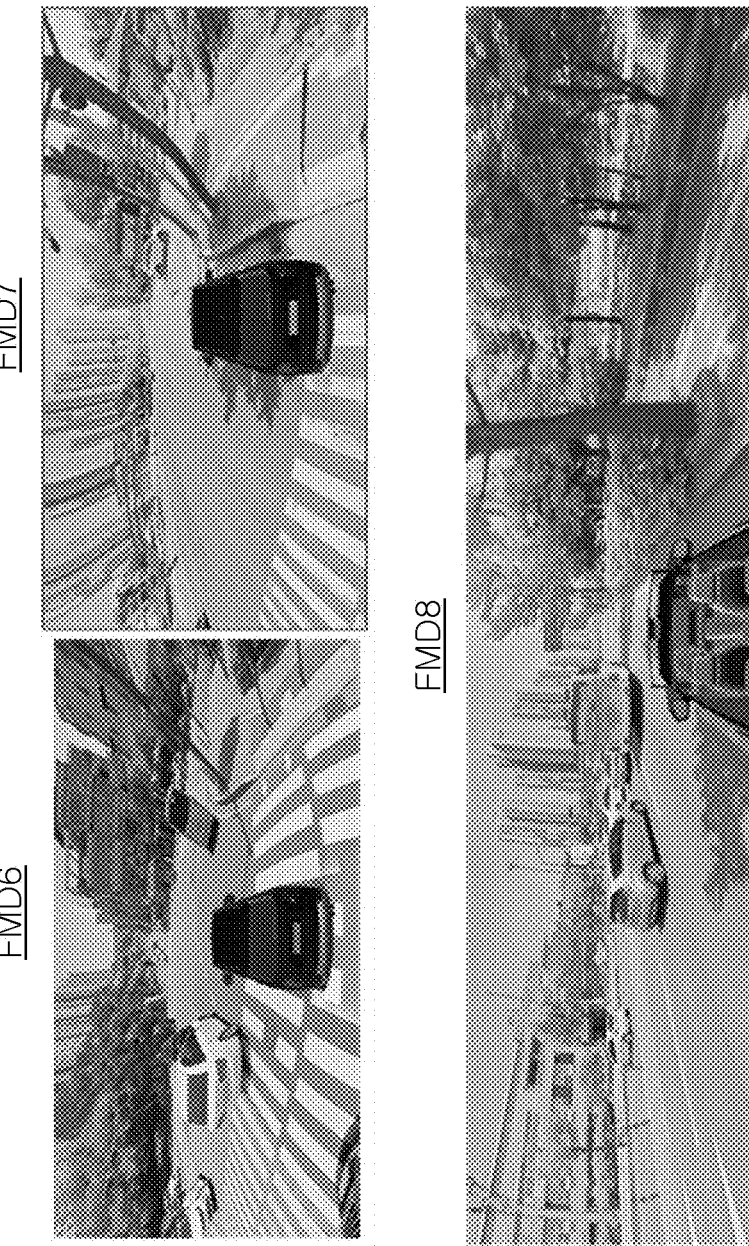
FIG. 7 is a diagram illustrating synthesized three-dimensional images according to various fusion three-dimensional projection models (FMD6, FMD7, and FMD8) that can be selected according to surrounding environment information of a vehicle that can be included in the input information.

Referring to FIGS. 3A and 4, a first input device 310 may include at least one of a button panel 311, a touch sensor 313, and a receiver 312 in a vehicle V1, and may generate input information through a driver's manual input or remote reception. Accordingly, the input information may include at least one of information input by the driver of the vehicle V1 and information received remotely from an outside of the vehicle V1.

Referring to FIGS. 3A and 4, a second input device 320 may include a steering wheel 321, a gear panel 322, and a pedal 323 in a vehicle V1, and may generate input information based on a state of the vehicle V1 or the surroundings thereof. Accordingly, the input information may include at least one of driving direction information, driving speed information, gear shift information, and surrounding environment information of the vehicle V1.

The display device 430 may output a synthesized three-dimensional image received from the computing device 210. From a perspective of the driver of the vehicle V1, an overlapping region of the plurality of images in the synthesized three-dimensional image may correspond to a blind spot such as side pillars P1 and P2 of the vehicle V1, thereby providing important information to the driver. The 3D image providing system for a vehicle and the vehicle V1 according to an embodiment of the present disclosure may efficiently reduce a difference between a portion corresponding to the side pillars P1 and P2 in the synthesized three-dimensional image and an actual one, the safety and efficiency of the vehicle V1 and the surrounding environment thereof may be efficiently improved.

As set forth above, according to an embodiment of the present disclosure, in a system for providing a three-dimensional image for a vehicle (vehicle three-dimensional image system) capable of providing a synthesized three-dimensional image and a vehicle including the same, since a difference (distortion) between the synthesized three-dimensional image and an actual image may be reduced, the safety and efficiency of the vehicle and a surrounding environment thereof may be improved.

In the present specification, the expression 'an embodiment' used in the present disclosure does not necessarily refer to the same embodiment, and is provided to emphasize and describe different unique characteristics. However, an embodiment presented above is not excluded from being implemented in combination with features of another embodiment. For example, even if a matter described in one specific embodiment is not described in another embodiment, it can be understood as a description related to another embodiment, unless there is a description contradicting or contradicting the matter in the other embodiment.

Terms used in this disclosure are only used to describe one embodiment, and are not intended to limit the disclosure. In this case, singular expressions include plural expressions unless the context clearly indicates otherwise.

The vehicle V1, cameras 110, 120, 130, 140, 150, 160, 170, and 180, computing device 210, look-up table 220, first input device 310, button panel 311, touch sensor 313, receiver 312, second input device 320, steering wheel 321, gear panel 322, pedal 323, display 430, processors, memories, and other apparatuses, devices, units, modules, and components described herein with respect to FIGS. 1-7 are implemented by or representative of hardware components. Examples of hardware components that may be used to perform the operations described herein where appropriate include controllers, sensors, generators, drivers, memories, comparators, arithmetic logic units, adders, subtractors, multipliers, dividers, integrators, and any other electronic components configured to perform the operations described herein. In other examples, one or more of the hardware components that perform the operations described herein are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described herein. The hardware components may also access, manipulate, process, create, and store data in response to execution of the instructions or software. For simplicity, the singular term "processor" or "computer" may be used in the description of the examples described herein, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described herein are performed by computing hardware, for example, by one or more processors or computers, implemented as described above executing instructions or software to perform the operations described herein that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A vehicle three-dimensional image system comprising:
a computing device configured to generate a synthesized three-dimensional image by acquiring a plurality of images from a plurality of cameras installed on a vehicle and arranging the plurality of images on a surface of a three-dimensional projection model,
wherein the computing device is configured to generate the synthesized three-dimensional image by:
storing a plurality of three-dimensional projection models,
selecting one of the plurality of three-dimensional projection models according to input information,
arranging the plurality of images on a surface of the selected three-dimensional projection model,
wherein the plurality of three-dimensional projection models comprise first and second three-dimensional projection models and a fusion three-dimensional projection model in which a portion of the first three-dimensional projection model and a portion of the second three-dimensional projection model are mixed,
wherein the fusion three-dimensional projection model comprises an asymmetrical fusion three-dimensional projection model in which, a portion of the fusion three-dimensional projection model, corresponding to one side of a default driving direction of the vehicle and a portion of the fusion three-dimensional projection model, corresponding to the other side thereof are asymmetrical to each other, and
wherein the computing device is configured to generate the synthesized three-dimensional image by arranging the plurality of images on one surface selected from the first and second three-dimensional projection models or by selecting the asymmetrical fusion three-dimensional projection model according to a driving direction information of the vehicle and arranging the plurality of images on the selected asymmetrical fusion three-dimensional projection model.

2. The vehicle three-dimensional image system of claim 1, wherein the input information comprises at least one of driving direction information, driving speed information, gear shift information, and surrounding environment information of the vehicle.

3. The vehicle three-dimensional image system of claim 1, wherein the input information comprises at least one of information input by a driver of the vehicle, and information received remotely from an outside of the vehicle.

4. The vehicle three-dimensional image system of claim 3, wherein the computing device is configured to:
transmit the synthesized three-dimensional image to a display device, change the selected three-dimensional projection model to an other one of the plurality of three-dimensional projection models according to the input information after the synthesized three-dimensional image is output by the display device, and
arrange the plurality of images on a surface of the changed three-dimensional projection model.

5. The vehicle three-dimensional image system of claim 1, wherein the computing device is configured to:
store a look-up table, and
arrange the plurality of images on a surface of the three-dimensional projection model selected by correspondence between the input information and the three-dimensional projection models in the look-up table.

6. The vehicle three-dimensional image system of claim 1, wherein the number of the plurality of cameras is four or more, and
wherein an image acquired by at least one of the plurality of cameras is arranged on one surface of the plurality of three-dimensional projection models and is not arranged on an other surface thereof.

7. The vehicle three-dimensional image system of claim 1,
wherein the first three-dimensional projection model has a shape relatively closer to a sphere than the second three-dimensional projection model, and
wherein the second three-dimensional projection model has a shape relatively closer to a polyhedron than the first three-dimensional projection model.

8. A vehicle, comprising:
the vehicle three-dimensional image system according to claim 1;
a plurality of cameras configured to transmit a plurality of images to the computing device; and
a display device configured to output a synthesized three-dimensional image received from the computing device.

9. A vehicle three-dimensional image system comprising:
a computing device configured to generate a synthesized three-dimensional image by acquiring a plurality of images from a plurality of cameras installed on a vehicle, and arranging the plurality of images on a surface of a three-dimensional projection model,
wherein the computing device is configured to generate the synthesized three-dimensional image by arranging the plurality of images on a surface of a fusion three-dimensional projection model in which a portion of a first three-dimensional projection model and a portion of a second three-dimensional projection model are mixed according to input information,
wherein the first three-dimensional projection model has a shape relatively closer to a sphere than the second three-dimensional projection model,
wherein the second three-dimensional projection model has a shape relatively closer to a polyhedron than the first three-dimensional projection model,
wherein the fusion three-dimensional projection model comprises an asymmetrical fusion three-dimensional projection model in which a portion of the fusion three-dimensional projection model, corresponding to one side of a reference driving direction of the vehicle and a portion of the fusion three-dimensional projection model, corresponding to the other side thereof are asymmetrical to each other, and
wherein the computing device is configured to generate the synthesized three-dimensional image by selecting the asymmetrical fusion three-dimensional projection model according to a driving information of the vehicle and arranging the plurality of images on the selected asymmetric fusion three-dimensional projection model.

10. The vehicle three-dimensional image system of claim 9, wherein the input information comprises at least one of driving direction information, driving speed information, gear shift information, surrounding environment information of the vehicle, information input by a driver of the vehicle, and information received remotely from an outside of the vehicle, and wherein the computing device is configured to store a look-up table that corresponds a portion of the input information and the fusion three-dimensional projection model to each other.

11. The vehicle three-dimensional image system of claim 9, wherein the computing device is configured to generate the synthesized three-dimensional image by:

selecting one of the fusion three-dimensional projection model, the first three-dimensional projection model, and the second three-dimensional projection model according to input information, and arranging the plurality of images on a surface of the selected three-dimensional projection model.

12. The vehicle three-dimensional image system of claim 11, wherein the number of the plurality of cameras is four or more, and an image acquired by at least one of the plurality of cameras is arranged on one surface of one of the fusion three-dimensional projection model, the first three-dimensional projection model, and the second three-dimensional projection model and is not arranged on remaining surfaces thereof.

13. A vehicle, comprising:

the vehicle three-dimensional image system according to claim 9;

a plurality of cameras configured to transmit a plurality of images to the computing device; and a display device configured to output a synthesized three-dimensional image received from the computing device.

14. A non-transitory computer-readable storage medium storing instructions that, when executed by a processor, cause the processor to generate a synthesized three-dimensional image by acquiring a plurality of images from a plurality of cameras installed on a vehicle, and arranging the plurality of images on a surface of a three-dimensional projection model, and transmit the synthesized three-dimensional image to a display device configured to output the synthesized three-dimensional image, wherein the synthesized three-dimensional image is generated by:

storing a plurality of three-dimensional projection models, selecting one of the plurality of three-dimensional projection models according to input information, arranging the plurality of images on a surface of the selected three-dimensional projection model, wherein the plurality of three-dimensional projection models comprise first and second three-dimensional projection models and a fusion three-dimensional projection model in which a portion of the first three-dimensional projection model and a portion of the second three-dimensional projection model are mixed, wherein the fusion three-dimensional projection model comprises an asymmetrical fusion three-dimensional projection model in which, a portion of the fusion three-dimensional projection model, corresponding to one side of a default driving direction of the vehicle and a portion of the fusion three-dimensional projection model, corresponding to the other side thereof are asymmetrical to each other, and wherein the computing device is configured to generate the synthesized three-dimensional image by arranging the plurality of images on one surface selected from the first and second three-dimensional projection models or by selecting the asymmetrical fusion three-dimensional projection model according to a driving direction information of the vehicle and arranging the plurality of images on the selected asymmetrical fusion three-dimensional projection model.

* * * * *